US008576140B2

(12) United States Patent
Wilsher

(10) Patent No.: US 8,576,140 B2
(45) Date of Patent: Nov. 5, 2013

(54) METHODS AND SYSTEMS FOR SIMULTANEOUS LOCAL AND CONTEXTUAL DISPLAY

(75) Inventor: Michael J. Wilsher, Letchworth (GB)

(73) Assignee: Xerox Corporation, Norwalk, CT (US)

( * ) Notice: Subject to any disclaimer, the term of this patent is extended or adjusted under 35 U.S.C. 154(b) by 201 days.

(21) Appl. No.: 13/172,794

(22) Filed: Jun. 29, 2011

(65) Prior Publication Data

US 2013/0002522 A1    Jan. 3, 2013

(51) Int. Cl.
*G09G 5/00* (2006.01)

(52) U.S. Cl.
USPC .......................... 345/1.2; 345/33; 340/995.15

(58) Field of Classification Search
USPC ................ 345/1.1, 1.2, 11, 30, 33, 156, 630; 340/995.1, 995.11, 995.14, 995.15, 340/995.24, 995.27
See application file for complete search history.

(56) References Cited

U.S. PATENT DOCUMENTS

| 5,596,690 | A  | * | 1/1997 | Stone et al. ............. 345/630 |
| 6,275,232 | B1 | * | 8/2001 | Cataudella et al. .......... 715/815 |
| 7,557,818 | B1 | * | 7/2009 | Ubillos et al. ............. 345/684 |
| 2004/0223058 | A1 | * | 11/2004 | Richter et al. ............. 348/207.1 |
| 2007/0083819 | A1 | * | 4/2007 | Shoemaker ................ 715/767 |
| 2007/0141545 | A1 | * | 6/2007 | Tan et al. .................. 434/365 |
| 2008/0088646 | A1 | * | 4/2008 | Sako et al. ................ 345/647 |
| 2009/0284474 | A1 | * | 11/2009 | Komaki et al. ............ 345/173 |
| 2009/0303352 | A1 | * | 12/2009 | Fujinawa ................ 348/231.99 |
| 2010/0194683 | A1 | * | 8/2010 | Piper et al. ............... 345/156 |
| 2011/0190052 | A1 | * | 8/2011 | Takeda et al. ............. 463/31 |
| 2011/0285704 | A1 | * | 11/2011 | Takeda et al. ............. 345/419 |

* cited by examiner

*Primary Examiner* — Joe H Cheng
(74) *Attorney, Agent, or Firm* — MH2 Technology Law Group LLP

(57) ABSTRACT

Methods and systems for simultaneous local and contextual display comprise displaying a smaller, "local" image on a first surface using a first device having limited screen real estate. A second, larger, "contextual" image is simultaneously displayed on a larger second surface, which may comprise a projector screen or a separate computer monitor screen. The contextual image may be projected onto the second surface using the first device, or the first device may be coupled to a second device for displaying the contextual image. The local image comprises a subset of the contextual image such that a user may view both the fine detail of the local image using the first device and the context of the local image within the contextual image on the second surface.

25 Claims, 11 Drawing Sheets

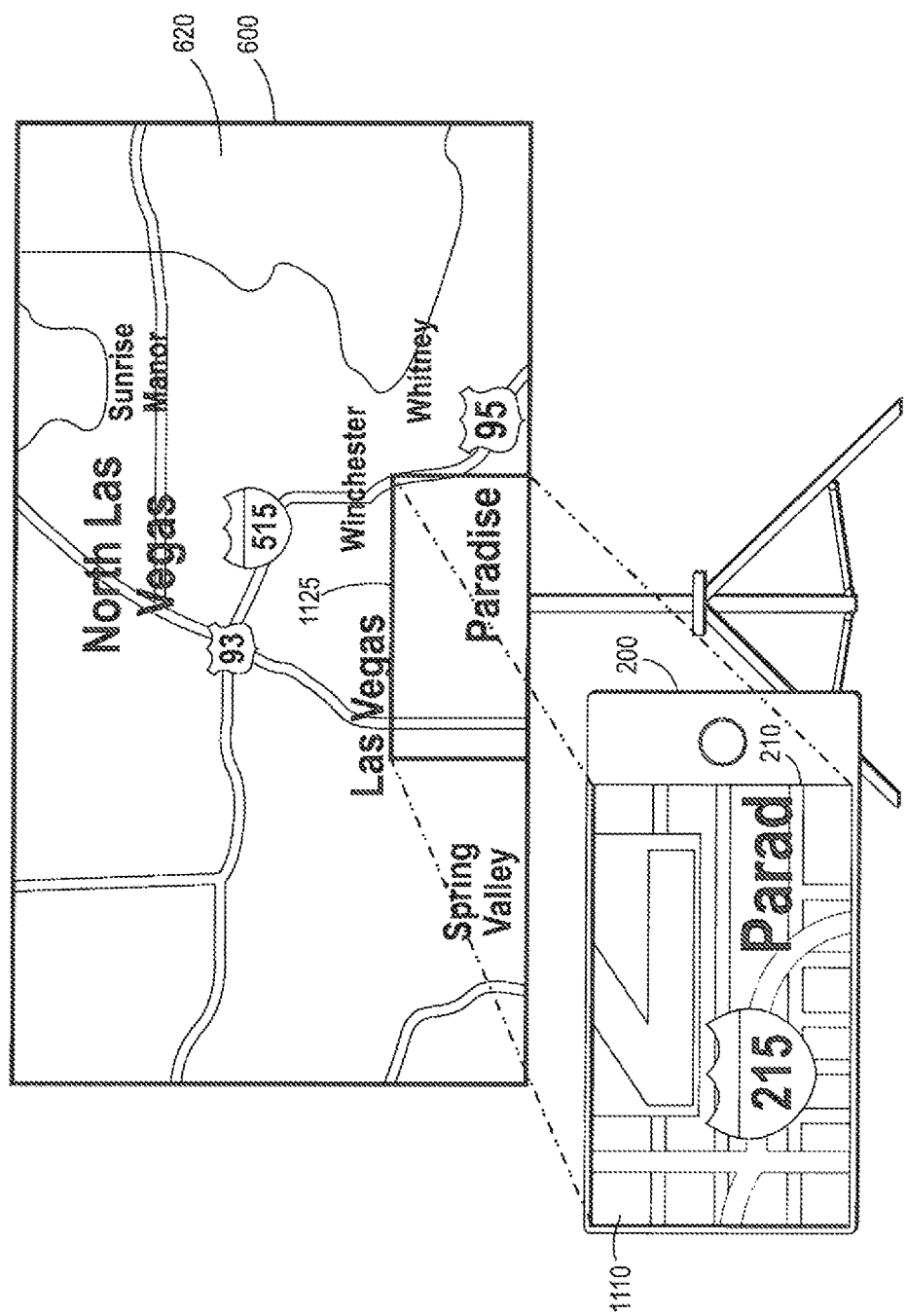

METHODS AND SYSTEMS FOR SIMULTANEOUS LOCAL AND CONTEXTUAL DISPLAY

TECHNICAL FIELD

The present disclosure relates generally to methods and systems for providing simultaneous local and contextual displays of digital images on handheld devices, computer monitors, projection screens, and other media.

BACKGROUND

Recent advances in handheld device technology, such as smartphones, have enabled users to access and view increasingly detailed and sophisticated forms of graphical data, such as maps, documents, file libraries, and medical images. However, due to the limited screen real estate of handheld devices, or even traditional desktop or laptop computer screen monitors, users are often forced to choose between viewing either the finer graphical detail that may be provided in the context of a zoomed-in focal area of an image or the less detailed graphical data that is available or visible when viewing a broader focal area for the purpose of determining the context of a zoomed-in image.

FIG. 1, for example, depicts a conventional approach to displaying images on a handheld device. A handheld device 100, such as a smartphone, may include a screen 110 for displaying images and other graphical user interface controls. A user may interface with handheld device 100 through a touchscreen interface provided through device screen 110 or through various physical buttons or controls on the device. Device 100 may be capable of displaying images, such as maps, documents, or other graphical data on device screen 110. Using the example of displaying maps, a user may use device 100 to display an image 115 of a map on device screen 110. Device 100 may allow the user to scroll image 115 and thus focus on geographical regions adjacent to image 115.

Device 100 may also allow the user to zoom in or out from image 115 to display a larger or smaller geographical region in device screen 110. As the user zooms in or out, device 100 may display a new image 115 that contains more or less detail, such as roads or municipality labels. For example, if a user zooms out from the current geographical focus of image 115, device 100 may display a larger geographical area in device screen 110 and may reduce the amount of low-level geographical data by omitting the display of smaller roads or municipality labels. Conversely, if the user zooms in from the current geographical focus of image 115, device 100 may display a smaller geographical area in device screen 110 and may increase the amount of low-level geographical data by displaying more detail corresponding to individual roads, rivers, parks, neighborhoods, or labels identifying the same.

Although the above technique—namely, increasing or decreasing granularity, resolution, or graphical detail as an image is zoomed—allows a user to view both large and small geographical focus areas of a map, this technique does not enable the user to view both fine graphical detail and broader contextual graphical data at the same time. For example, if the user zooms in to focus on a particular neighborhood in a municipality, while the user may be able to view individual streets and street labels, the user will be unable to view the broader context of where within a larger area, such as a city or state, that particular neighborhood lies. However, if the user zooms out to the city or state level, the user will either not be able to see any fine detail regarding the neighborhood of interest, or such detail will be too small for the user to easily discern.

There is therefore a need for methods and systems for simultaneously viewing local and contextual images, such as maps, documents, libraries, or medical images such that a user may view both the fine detail of a particular area of interest as well as the broader context of that area of interest.

SUMMARY OF THE INVENTION

The present invention comprises methods and systems for providing simultaneous or concurrent local and contextual displays of digital images on handheld devices, computer monitors, projection screens, and other media. In one embodiment, a smaller, "local" image is displayed on a first surface using a first device having limited screen real estate. A second, larger, "contextual" image is simultaneously displayed on a larger second surface, which may comprise a projector screen or a separate computer monitor screen. The contextual image may be projected onto the second surface using the first device, or the first device may be coupled to a second device for displaying the contextual image. The local image comprises a subset of the contextual image such that a user may view both the fine detail of the local image using the first device and the context of the local image within the contextual image on the second surface.

In some embodiments, the local and contextual images may be visually aligned such that the local image corresponds to the dimensions and content of the contextual image when the first surface is placed in front of the second surface in a line of sight. In some embodiments, in response to a user scrolling the local image, the first device or second device may simultaneously scroll the contextual image to maintain visual alignment between the local and contextual images. Or, the contextual image may be displayed in a substantially constant manner while a visual indicator, such as a rectangle is scrolled within the contextual image to indicate the placement of the local image within the contextual image.

Additional objects and advantages of the invention will be set forth in part in the description that follows, and in part will be obvious from the description, or may be learned by practice of the invention. The objects and advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate various embodiments of the invention and together with the description, serve to explain the principles of the invention. In the drawings:

FIG. 11 is a diagram depicting an exemplary approach to maintaining synchronization between a local image and a contextual image while allowing a user to scroll the local image, consistent with certain disclosed embodiments.

DETAILED DESCRIPTION

Figure 1:
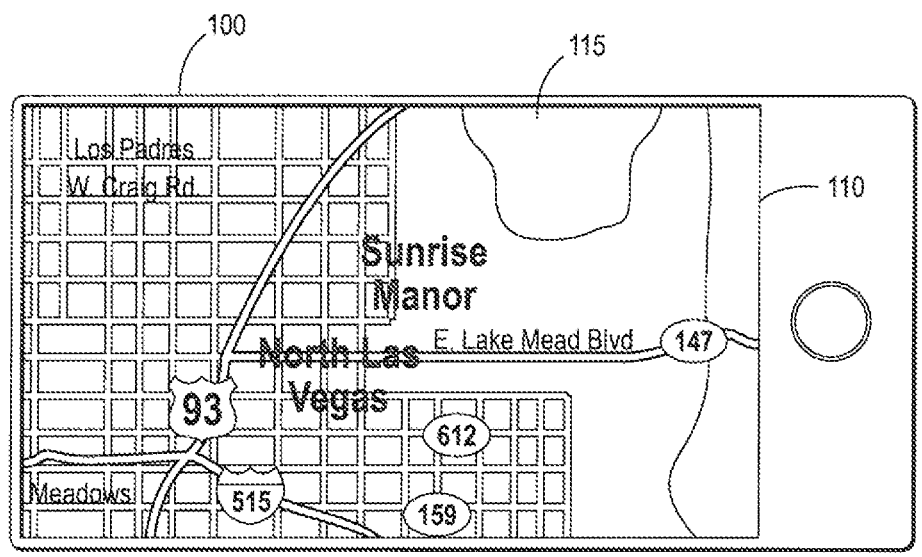
FIG. 1 is a diagram illustrating a conventional approach to displaying images on a handheld device.

The following detailed description refers to the accompanying drawings. Wherever possible, the same reference numbers are used in the drawings and the following description to refer to the same or similar parts. While several exemplary embodiments and features of the invention are described herein, modifications, adaptations, and other implementations are possible, without departing from the spirit and scope of the invention. Accordingly, the following detailed description does not limit the invention. Instead, the proper scope of the invention is defined by the appended claims.

Figure 2:
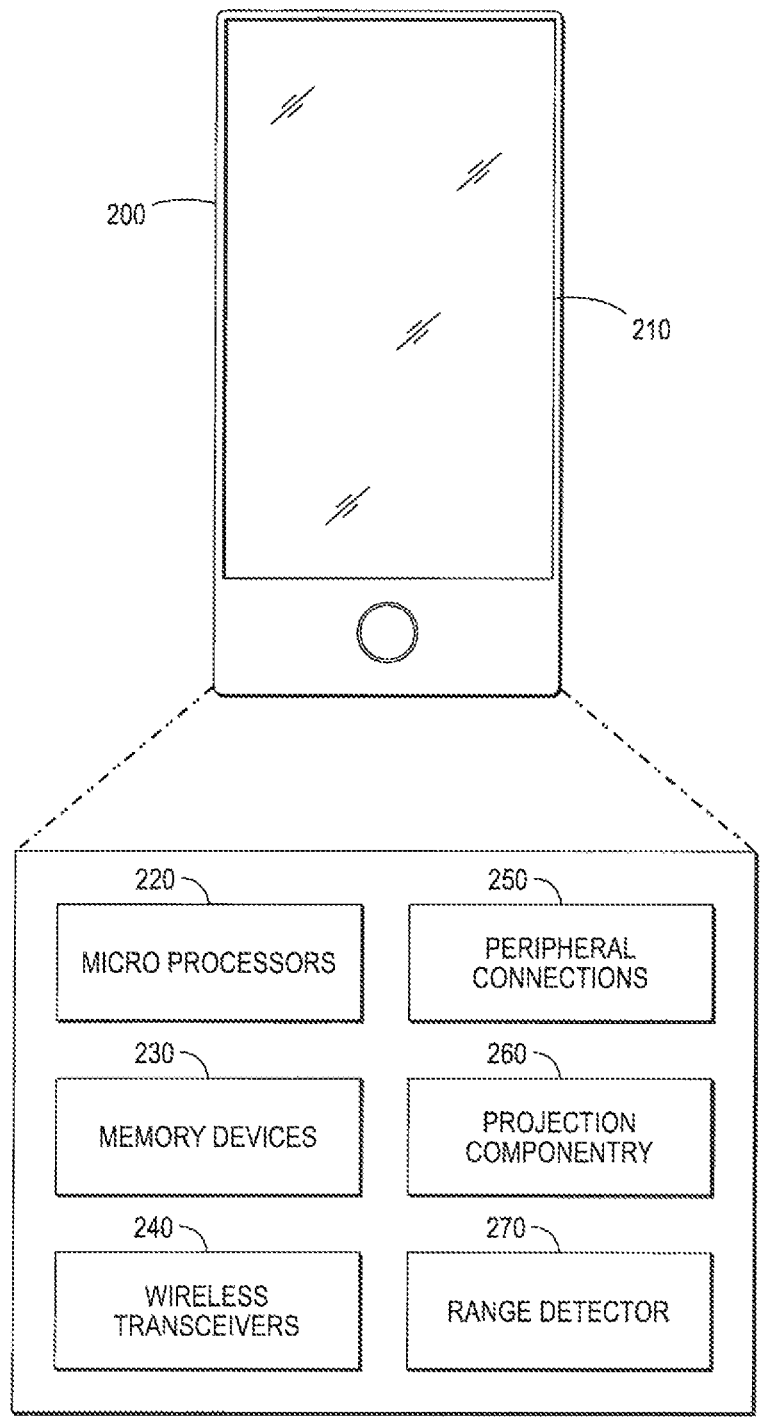
FIG. 2 is a diagram depicting an exemplary device for simultaneously displaying local and contextual images, consistent with certain disclosed embodiments.

FIG. 2 is a diagram depicting an exemplary device for simultaneously displaying local and contextual images, consistent with certain disclosed embodiments. Although depicted in FIG. 2 as a handheld device, such as a smartphone or PDA, device 200 is not limited to handheld devices, but may comprise any device or device system capable of displaying graphical data, such as images. Using the example of a handheld device, device 200 may comprise a display screen 210, such as a liquid crystal display (LCD), plasma, cathode-ray, pixel-based display, or other type of screen capable of rendering images in response to electronic signals. Device 200 may additionally include, for example, one or more microprocessors 220 of varying core configurations and clock frequencies; one or more memory devices or computer-readable media 230 of varying physical dimensions and storage capacities, such as flash drives, hard drives, random access memory, etc., for storing data, such as images, files, and program instructions for execution by one or more microprocessors 220; one or more wireless transceivers 240 for communicating over wireless protocols such as wireless Ethernet, code divisional multiple access (CDMA), or other wireless media; one or more peripheral connections 250, such as universal serial bus (USB) connections or video interfaces for communicating with or sending display data to an external device, such as a separate computer or computer monitor screen; one or more projection components 260 for projecting light and images onto a physical surface, such as a projector screen; and one or more range detectors 270, such laser or ultrasonic range finders, for determining device 200's physical proximity to a physical object or surface, such as a projector screen. Those skilled in the art will appreciate that the above-described componentry is exemplary only, as device 200 may comprise any type of hardware componentry, including any necessary accompanying firmware or software, for performing the disclosed embodiments.

Figure 3:
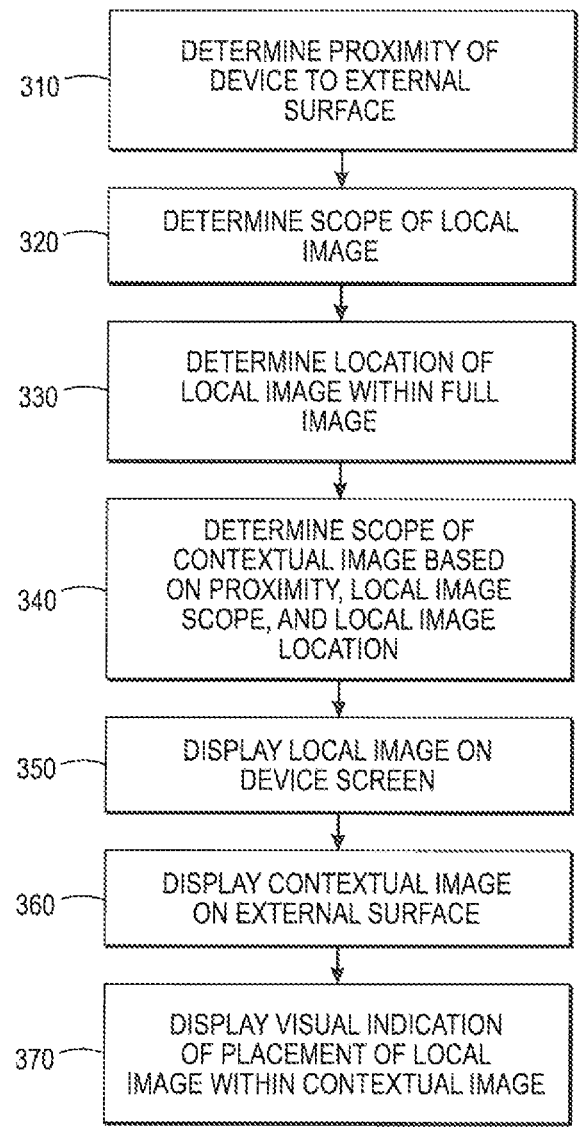
FIG. 3 is a flow diagram illustrating an exemplary method of simultaneously displaying local and contextual images, consistent with certain disclosed embodiments.
Figure 4:
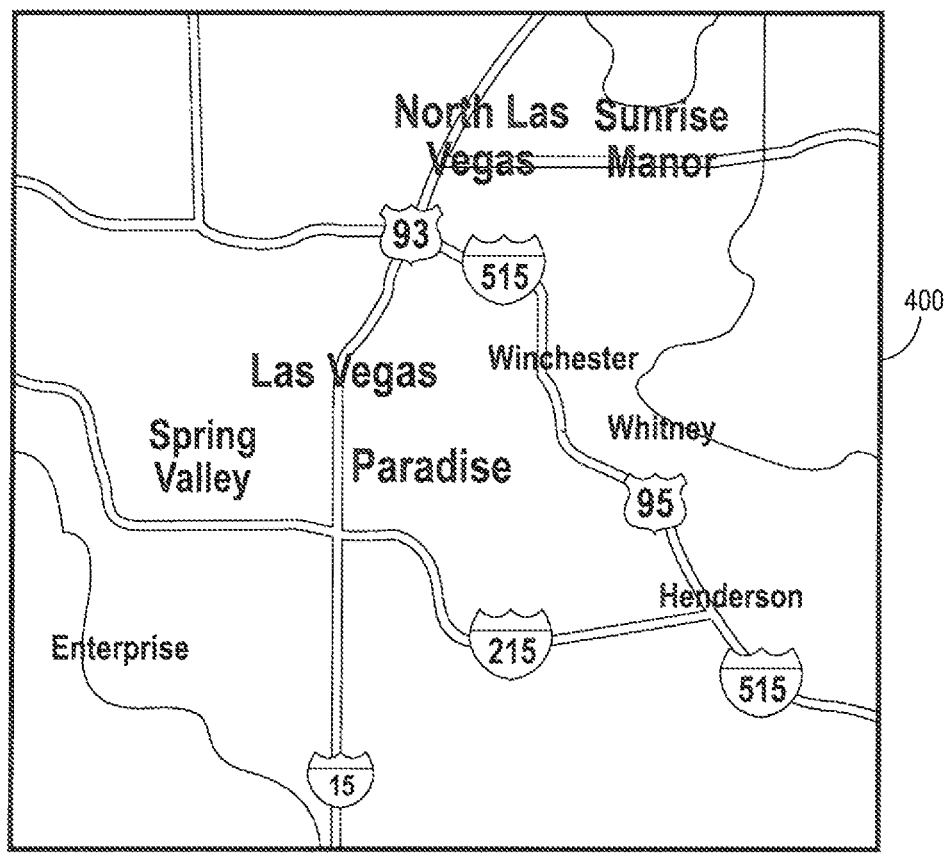
FIG. 4 depicts an exemplary image from which local and contextual images may be extracted, consistent with certain disclosed embodiments.

FIG. 3 is a flow diagram illustrating an exemplary method of simultaneously displaying local and contextual images, as depicted in FIGS. 4-8, consistent with certain disclosed embodiments. As depicted in FIG. 4, an image 400, such as a map, may be available to device 200 for access and display. Image 400 may comprise any type of file format, such as gif, jpeg, bmp, tiff, or other format capable of storing image or other kinds of data. Image 400, however, is not confined to any particular file format, or even a data file at all. Image 400 may comprise image or graphical data in any form or from any source capable of display on a device screen or physical surface.

For example, device 200 may retrieve graphical data comprising image 400 from a separate device, such as a server (not depicted), via serial, Ethernet, or other link. Device 200 may obtain portions of graphical data contained in image 400 in streaming, "push," or "pull" form, for example, from the server to display such varying portions as needed. For example, device 200 may obtain a portion of graphical data representing one particular focal area of image 400 for display on device screen 210. And, in response to a user performing a scrolling operation on device 200 in order to view a different focal area of image 400, device 200 may retrieve different or additional data from the server in order to display the focal area of image 400 requested as a result of the user's scrolling operation.

Figure 5:
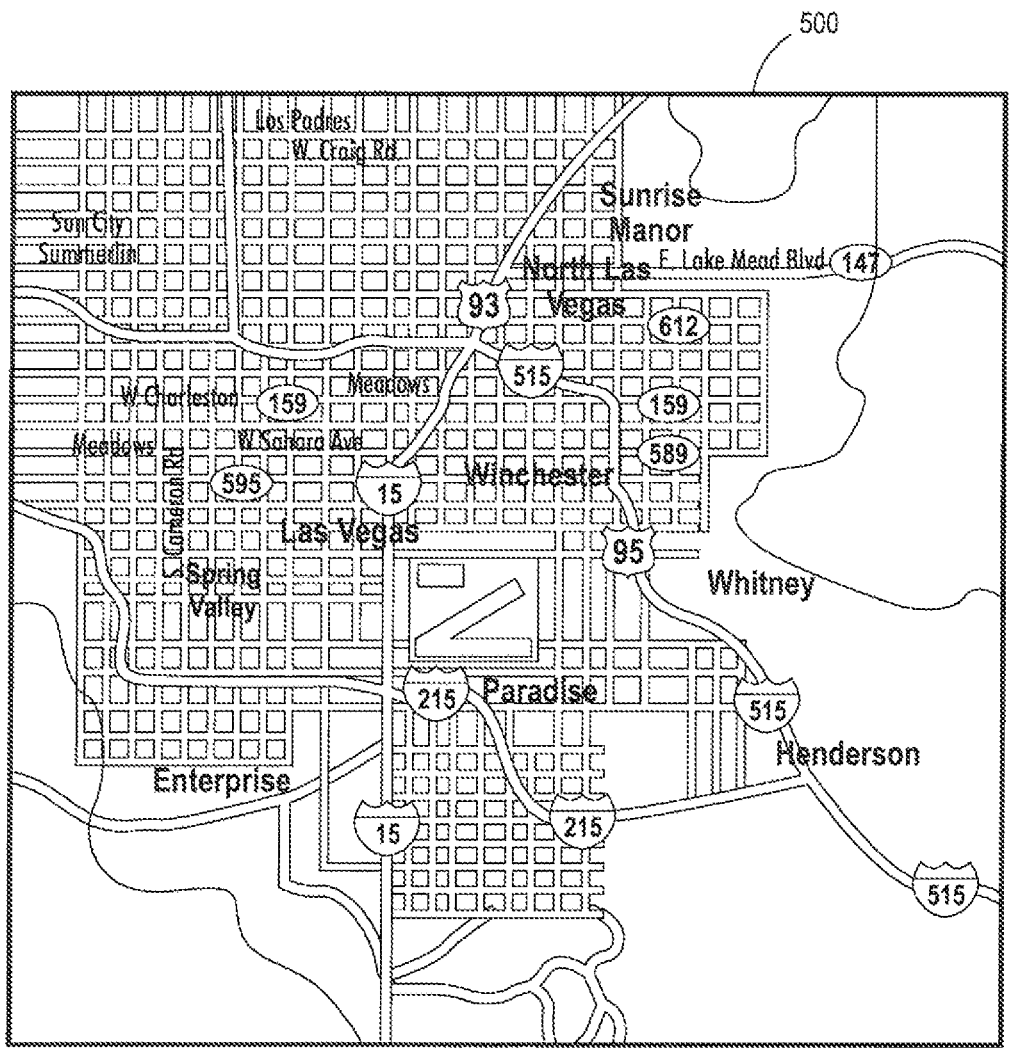
FIG. 5 depicts an exemplary image from which local and contextual images may be extracted, consistent with certain disclosed embodiments.

Different focal areas of image 400 may include adjacent graphical areas within image 400 or different "zoom" areas within image 400. Image 400 may also comprise multiple layers of one or more focal areas. For example, as depicted in FIG. 4, image 400 may include a first layer that depicts a particular geographical region of a map with only minor granularity, such that only major highways, rivers, or municipality labels are depicted. As depicted in FIG. 5, image 400 may include a second layer 500 that depicts the same geographical region as the first layer, but includes more granularity, such as street grids and names. Those skilled in the art will appreciate that image 400 is not limited to the embodiments depicted or described with respect to FIGS. 4 and 5, but may comprise any kind of data in any form, whether embodied in a file or computer-readable medium prior to display or dynamically generated for display.

Figure 6:
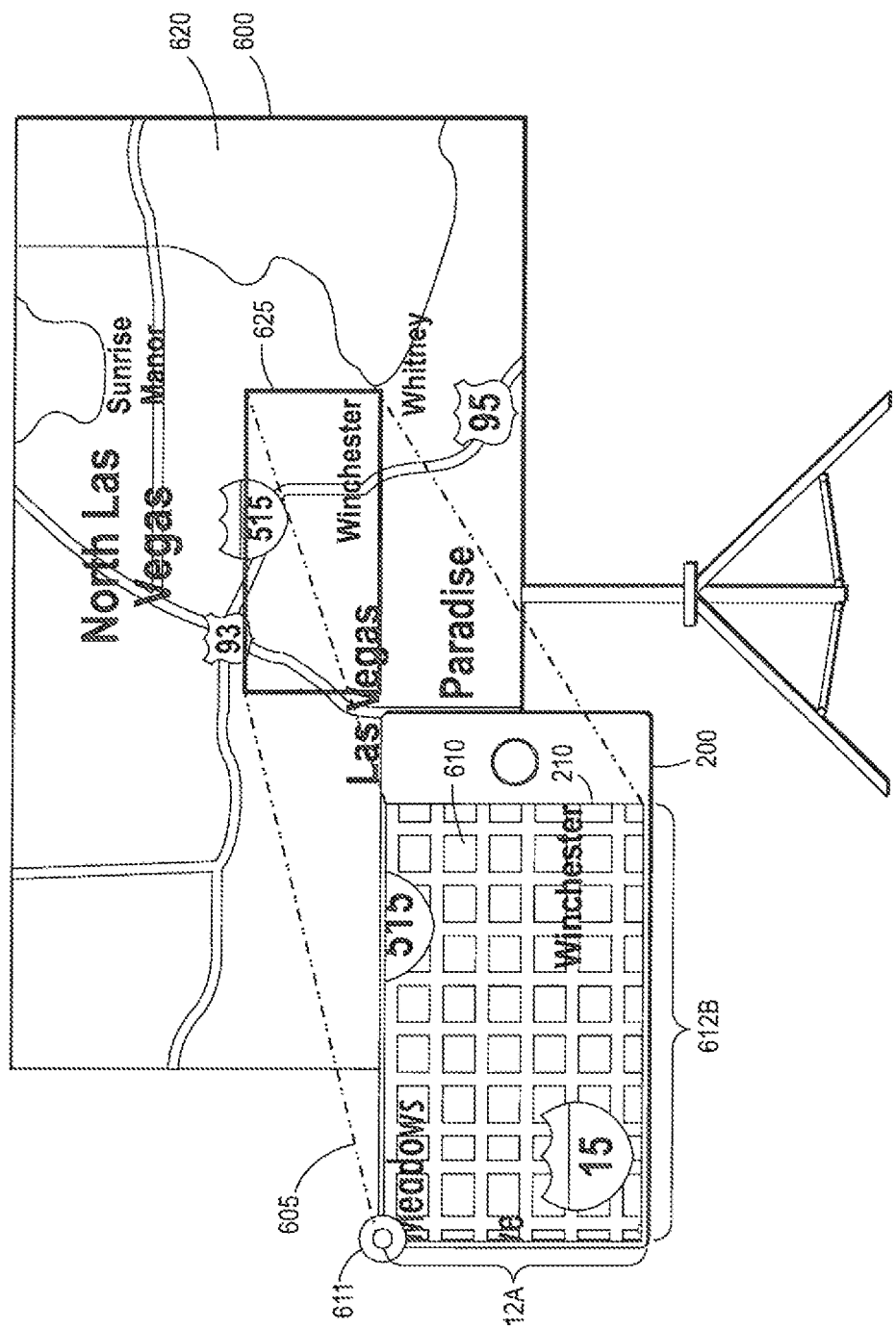
FIG. 6 is a diagram depicting an exemplary approach to simultaneously displaying local and contextual images, consistent with certain disclosed embodiments.

Returning to FIG. 3, in some embodiments, device 200 may determine its proximity, such as physical distance 605, from an external surface, such as projector screen 600 depicted in FIG. 6 (step 310). Device 200 may use range detector componentry 270, such as a laser range finder or an ultrasonic range finder (not depicted) to determine device 200's physical distance from projector screen 600. An exemplary laser range finder may determine distance 605 by emitting light, such as an infrared light pulse, from device 200 to projector screen 600 and measuring the degree of red-shifting or blue-shifting in the light as it is reflected off of projector screen 600 back to device 200 to determine movement of device 200 toward or away from projector screen 600. An exemplary ultrasonic range finder may determine distance 605 by emitting sound waves from device 200 to projector screen 600 and measuring the time it takes for such sound waves to bounce off of projector screen 600 and return to device 200. Those skilled in the art will appreciate that there may be other techniques used by device 200 to detect its proximity to an external surface. In other embodiments, device 200 may be manually configured by a user or other device to specify a distance 605, and in other embodiments, it may not be necessary for device 200 to operate with any knowledge of its proximity to any external surface.

In step 320, device 200 may determine the scope of a local image. As used herein, the term "local image" may refer to an image to be displayed on a smaller screen, such as device screen 210 of device 200. A local image may comprise a subset of a larger image, such as image 400 or image 500. Device 200 may determine the scope of the local image by determining the dimensions of the graphical or focal area subset of image 400 that should be displayed on device screen 210. Device 200 may also determine the scope of the local image in terms of the resolution or the granularity of the local image. FIG. 6 depicts an exemplary local image 610 displayed on device screen 210 of device 200. As can be seen, local image 610 comprises a subset of image 400 in that it comprises smaller focal area within image 400. In this example, local image 610 also contains a greater granularity than the image layer 400 depicted in FIG. 4, which granularity may come from image layer 500 of image 400, as depicted in FIG. 5.

In step 330, device 200 may determine the location of the local image within the full image. As used herein, the term "full image" may refer to an image or collection of image data, such as image 400, of which a local image comprises only a subset. For example, determining the scope and the location of local image 610 within image 400 may comprise determining a coordinate 611 on image 400 on which local image 610 is based, as well as a height dimension 612a and a width dimension 612b. Using coordinate 611, height dimension 612a, and width dimension 612b, device 200 may determine the precise geographical or focal area within image 400 that local image 610 comprises. Thus, as depicted in FIG. 6, it can be seen that local image 610 comprises a focal area of image 400 that is just north of the center of image 400.

In step 340, device 200 may determine the scope of a contextual image based on the proximity of device 200 to an external surface, based on the scope of the local image, and based on the location of the local image within the full image. As used herein, the term "contextual image" may refer to an image that is both a subset of the full image and a superset of the local image. For example, as depicted in FIG. 6, once the scope of image 610 has been determined, and once the location of image 610 within image 400 has been determined, device 200 may use its proximity to projector screen 600 to determine the scope and content of a contextual image 620 such that the area comprised by local image 610 would be located in the center of the larger contextual image 620 when displayed on a projector screen 600 that lies behind device 200 by the calculated distance.

In step 350, device 200 may display local image 610 on its screen 210. And, in step 360, device 200 may simultaneously display contextual image 620 on an external surface, such as a projector screen 600. Device 200 may project contextual image 620 onto projector screen 600, for example, using projector componentry 260. In some embodiments, projector componentry 260 may be located on the side of device 200 opposite screen 210, thus allowing a user to simultaneously view local image 610 and contextual image 620.

In step 370, device 200 may also project, along with contextual image 620, a visual indication of the placement of local image 610 within contextual image 620. For example, as depicted in FIG. 6, device 200 projects a rectangle 625 onto projector screen 600 indicating the scope and location of local image 610 within contextual image 620. Thus, it can be seen that local image 610 comprises a subset of contextual image 620 corresponding to the "Winchester" suburb of Las Vegas, Nev. In other embodiments, the scope and location of local image 610 within contextual image 620 may be depicted or indicated in other manners, such as providing a blank space within rectangle 625 in which graphical data of contextual image 620 is not displayed.

By displaying contextual image 620 on projector screen 600, while simultaneously displaying local image on screen 210 of device 200, a user is able to view both the detail of local image 610 and the context of local image 610 within a fuller image 400. Thus, for example, if the user were able to view only local image 610, and the user desired to scroll local image 610 to move from a detailed view of the "Winchester" suburb to the "Sunrise Manor" suburb, the user would not know, solely by viewing local image 610, in which direction the user should scroll local image 610. However, by being able to view both local image 610 and contextual image 620 at the same time, the user may determine, by looking at contextual image 620, that the user need only scroll "up and to the right" in order to view the "Sunrise Manor" suburb as a new local image on device 200. Understanding where local image 610 currently fits within contextual image 620 is also enhanced by the display of rectangle 625 on contextual image 620.

Figure 8:
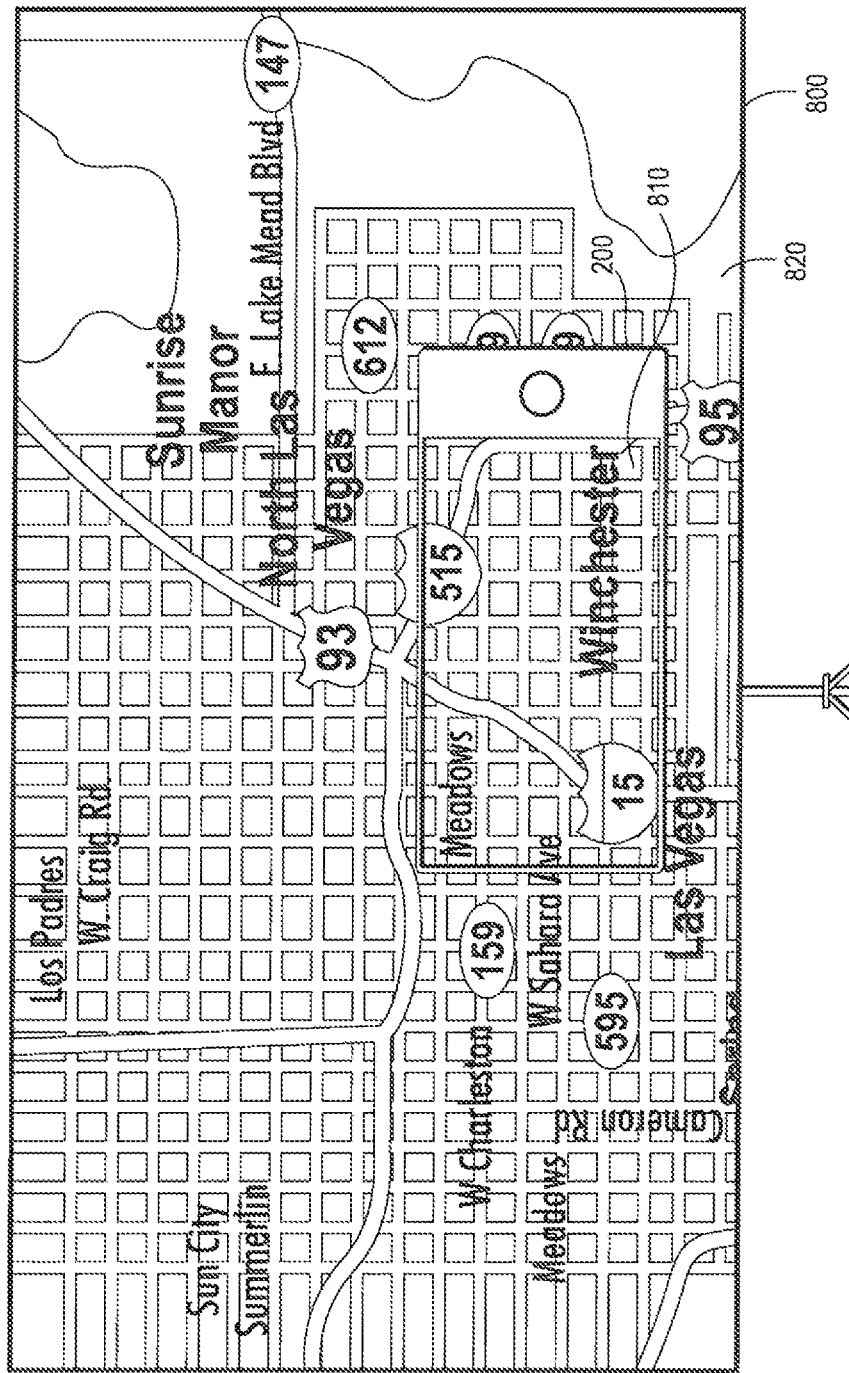
FIG. 8 is a diagram depicting an exemplary approach to simultaneously displaying local and contextual images using visual alignment, consistent with certain disclosed embodiments.

In some embodiments, as depicted in FIG. 6, local image 610 may contain greater detail or more granularity than the same area 625 that is simultaneously displayed on contextual image 620 corresponding to the scope of local image 610 within contextual image 620. For example, as can be seen in FIG. 6, contextual image 620 contains only modest granularity in the form of displaying only major highways, rivers, and municipality names, and thus individual street grids or other more granular information cannot be seen in area 625 of contextual image 620. By contrast, local image 610, which corresponds to the same geographical area as area 625, contains more granular detail than area 625, including street grids and additional labels. This approach allows users to view fine detail for only a particular area of interest—i.e., local image 610—while using contextual image 620 only (or mostly) to see the broader context of local image 610 without displaying unnecessary detail in that context. In other embodiments, as depicted in FIG. 8, both a local image 810 and a contextual image 820 may display the same amount of granular detail.

Figure 7:
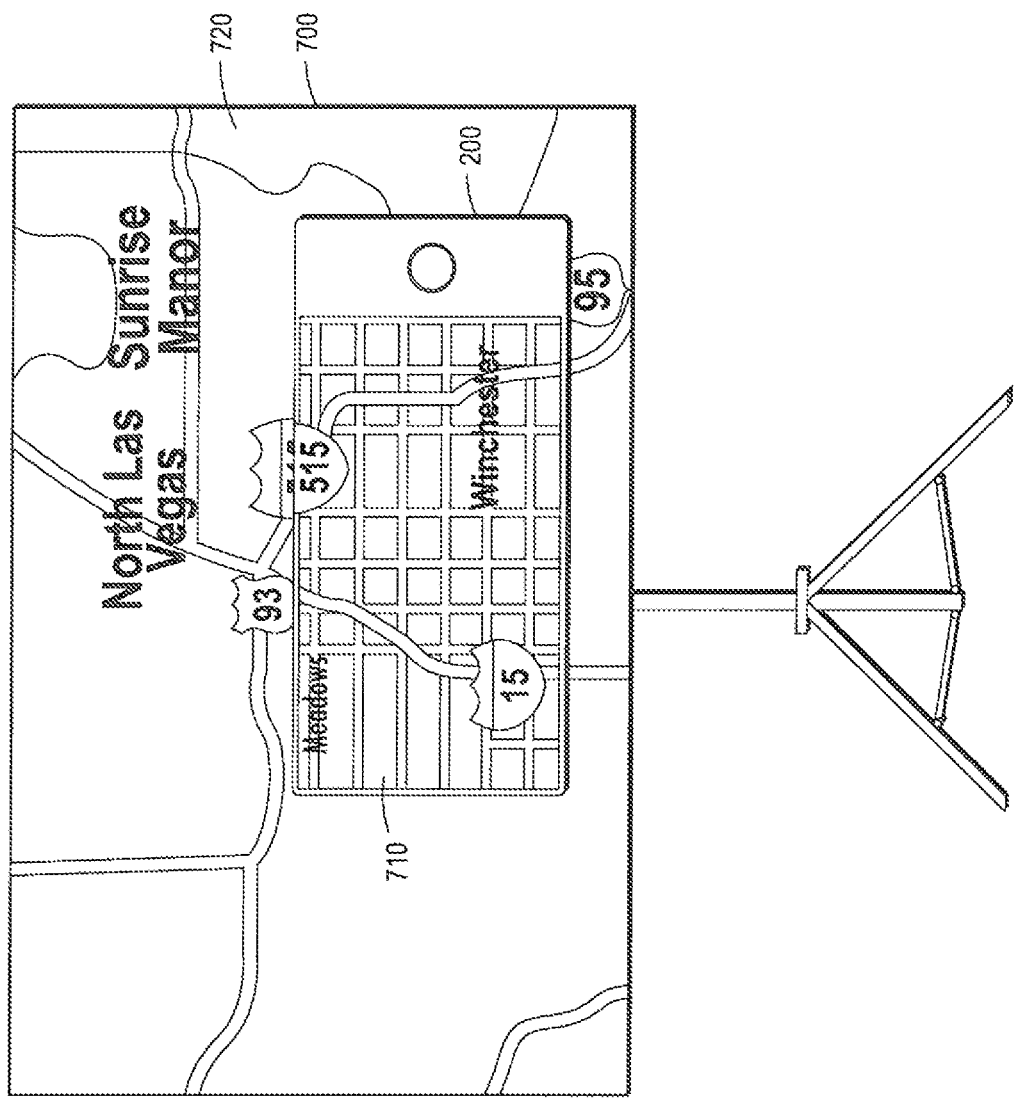
FIG. 7 is a diagram depicting an exemplary approach to simultaneously displaying local and contextual images using visual alignment, consistent with certain disclosed embodiments.

In some embodiments, it may be preferable to display a local image on a handheld device such that it is visually aligned with or within the contextual image. As depicted in FIG. 7, a local image 710 is displayed on device 200 and a contextual image 720 is projected by device 200 onto an external surface 700 such that when device 200 is placed directly in front of external surface 700, local image 710 is visually aligned with contextual image 720. That is, when a user views both local image 710 and contextual image 720, local image 710 is embedded within contextual image 720 such that local image 710 is at the same zoom level as the area of contextual image 720 that is obscured by device 200 within a line of sight. Put differently, the details—in this example, roads, highways, rivers, and labels—displayed at the boundaries of local image 710 visually align with the details in the areas of contextual image 720 that abut local image 710 or device 200 within a line of sight, such that there is continuity of details between local image 710 and contextual image 720 within a line of sight. FIG. 8 also depicts such a visual alignment between a local image 810 and a contextual image 820, such that the trajectories of streets, highways, and labels are maintained continuously in the visual transition between local image 810 and contextual image 820.

In some embodiments, it may be necessary for device 200 or other devices to determine the proximity between device 200 and a surface 800—e.g., using the above described laser or ultrasonic measurement techniques—or to analyze other relationships between the scopes and locations of local image 810 and contextual image 820 in order to achieve visual alignment. In other embodiments, a user may adjust the dimensions or zoom levels of local image 810 or contextual image 820, either together or in isolation, or the ratio therebetween, in order to achieve a desired visual alignment, or simply to display each image at desired zoom levels irrespective of visual alignment. For example, device 200 may include physical or graphical user interface controls that allow users to adjust such properties.

Device 200 may also provide functionality to allow the user to adjust the amount of detail displayed in either local image 610 or contextual image 620. For example, the user may adjust contextual image 620 to display the same level of detail (e.g., down to the street grid level) as local image 610, similar that shown in FIG. 8. Or, the user may adjust local image 610 to match the level of detail displayed by contextual image 620 or to display even less detail. Thus, the level of detail displayed in either local image 610 or contextual image 620 may be adjust along a fine gradient of levels of detail, either together or in isolation.

Figure 9:
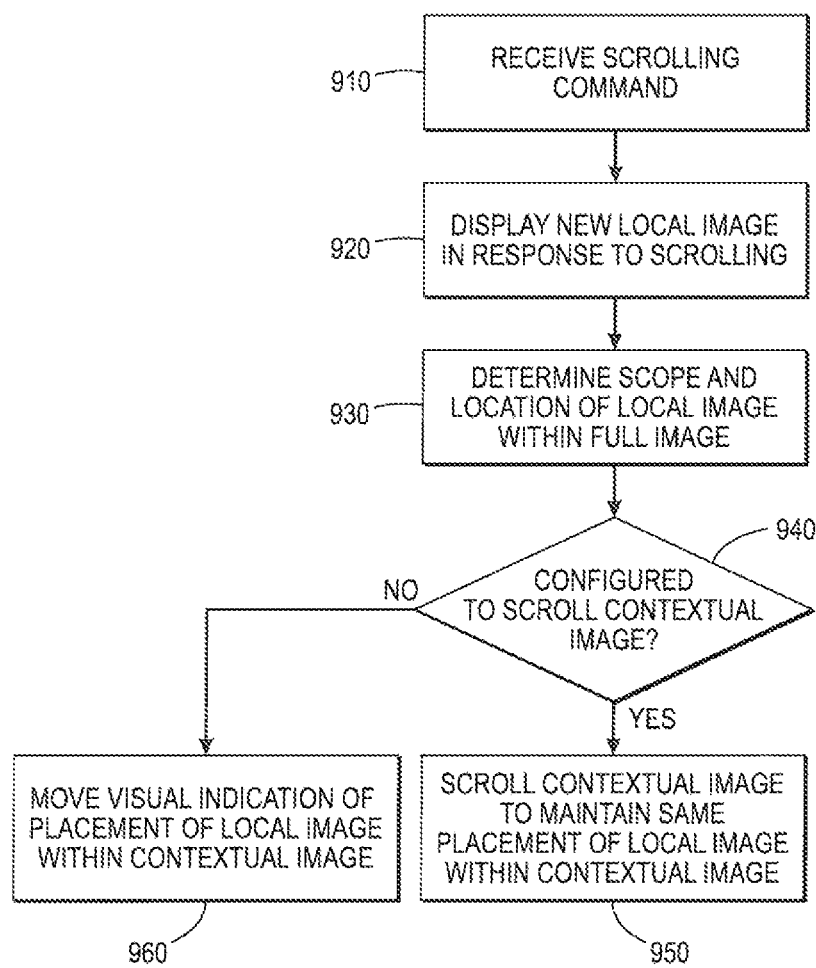
FIG. 9 is a flow diagram illustrating an exemplary method of maintaining synchronization between a local image and a contextual image while allowing a user to scroll the local image, consistent with certain disclosed embodiments.

In addition to simultaneously displaying both a local image as well as a contextual image to allow a user to see the broader context of the local image, disclosed embodiments also permit a user to focus on other areas for local display—e.g., on a handheld device—while continuing to maintain a visual relationship between a new local image and the broader contextual image. FIG. 9 is a flow diagram illustrating an exemplary method of maintaining synchronization between a local image and a contextual image while allowing a user to scroll the local image, as further illustrated in FIGS. 6, 10, and 11, consistent with certain disclosed embodiments.

In step 910, device 200 may receive a scrolling command indicating that a user (or program) wishes to display a different subset of image 400 as a new local image. For example, a user holding device 200 may instruct device 200 to focus on an area within image 400 that is to the south of area 625. The user may instruct device 200 to shift focus by, for example, sliding the user's finger upward on device screen 210. Those skilled in the art will appreciate that a user may initiate a scrolling action in any number of different ways, including using physical buttons or controls located on device 200, using voice commands, etc. Device 200 may also be instructed to perform a scrolling action by receiving a command from another device or program. In one embodiment, a user may instruct device 200 to scroll local image 610 by physically moving device 200 to visually align with a different sub-area within image 400.

In step 920, device 200 displays a new local image in response to the scrolling command. For example, if the user slid the user's finger upward along device screen 210, device 200 may display a new subset of image 400 as a new local image 1010. In step 930, device 200 may determine the scope and location of the new local image 1010 within image 400 in order to determine how to display a corresponding contextual image related to the new local image 1010.

Figure 10:
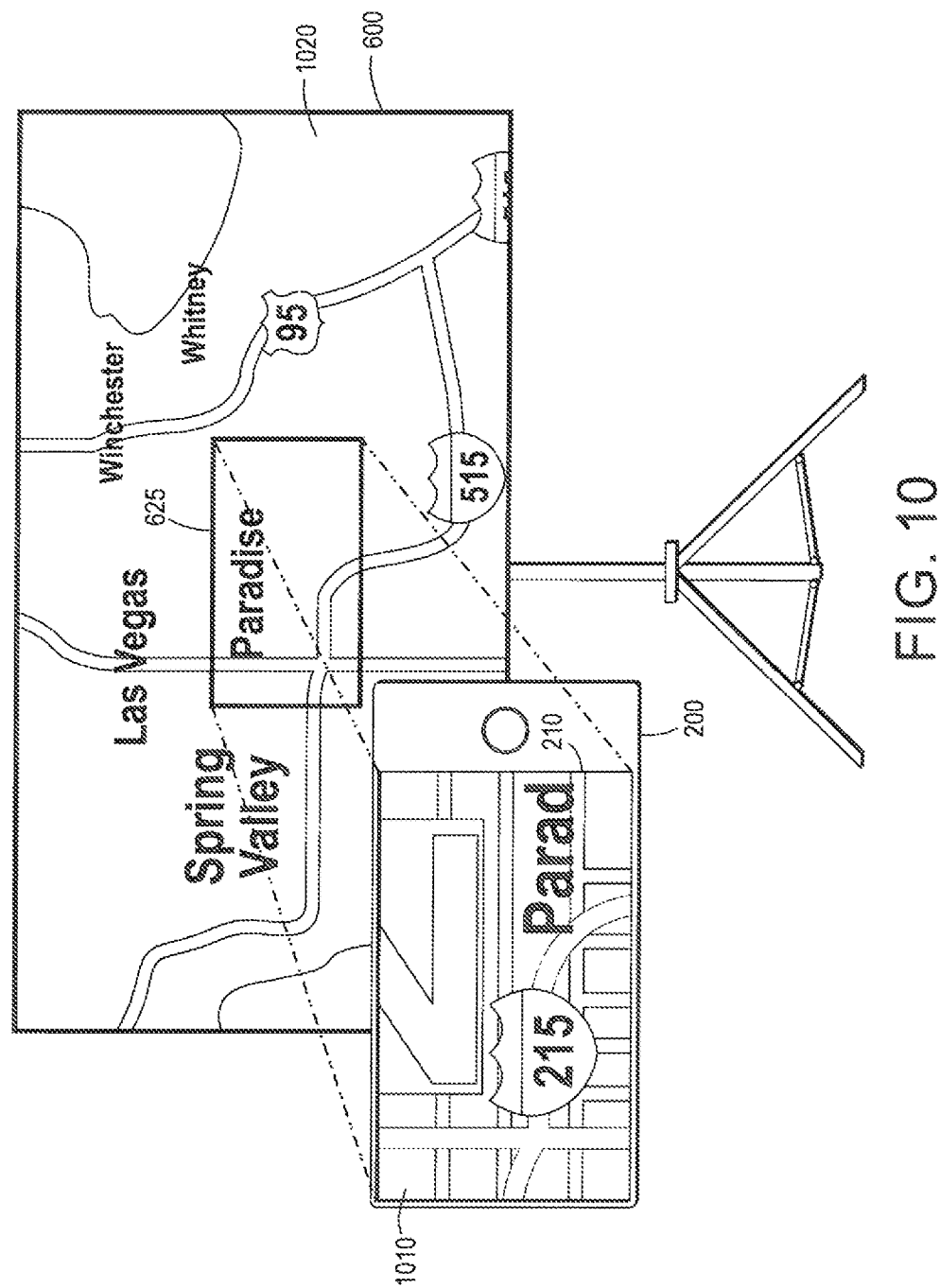
FIG. 10 is a diagram depicting an exemplary approach to maintaining synchronization between a local image and a contextual image while allowing a user to scroll the local image, consistent with certain disclosed embodiments.

In some embodiments, depending on the configuration of device 200, device 200 may take two different approaches to displaying a corresponding contextual image. If device 200 has been configured to scroll the contextual image (step 940, Yes), then device 200 may display a new contextual image 1020 such that new local image 1010 maintains the same location or placement 625 within new contextual image on the display surface 600 (step 950). That is, prior to the scrolling operation, as depicted in FIG. 6, local image 610 corresponded to a subset of contextual image 620 at the center 625 of contextual image 620. Similarly, after the scrolling operations, as depicted in FIG. 10, new local image 1010 corresponds to a subset of a new contextual 1010 image that is similarly at the center 625 of contextual image 1010. In other words, if device 200 has been configured to scroll the contextual image, then, as device 200 scrolls the local image on device screen 210, device 200 concurrently scrolls the corresponding contextual image such that the local image maintains a centered, or other constant, placement within the scrolling contextual image.

In this embodiment, for example, the constant placement or geographic relationship between new local image 1010 and new contextual image 1020 may be indicated by maintaining projection of rectangle 625 onto projector screen 600, which indicates the scope and location of local image 1010 within contextual image 1020 and depicts a consistent center alignment. This embodiment may be preferred, for example, if it is desired to maintain visual alignment between new local image 1010 and new contextual image 1020 in a manner similar to that depicted in FIG. 7 or FIG. 8.

In another embodiment, as depicted in FIG. 11, if device 200 has not been configured to scroll the contextual image (step 940, No), then device 200 may continue to display the same contextual image 620 that was displayed before the scrolling operation. And device 200 may instead display a new visual indicator—e.g., rectangle 1125—indicating the new location or placement of new local image 1110 within the same contextual image 620 as a result of the scrolling operation (step 960). In other words, if device 200 has not been configured to scroll the contextual image, then, as device 200 scrolls the local image on device screen 210, device 200 maintains a constant contextual image while concurrently scrolling a visual indicator (e.g., rectangle 625 moves along display surface 600 to become rectangle 1125) corresponding to the changing location or position of the local image within the contextual image. This embodiment may be preferred, for example, if it is not necessary to maintain visual alignment between new local image 1110 and contextual image 620, or in the event that a user physically moves device 200 to visually align with a different section of display surface 600.

The above-described scrolling techniques are also not limited to scrolling operations in which the dimensions of the local image remain constant, as these techniques may also be applied to scrolling operations that additionally or exclusively involve zooming operations. For example, a user could instruct device 200 to zoom in on a smaller subset of local image 610, such that the smaller subset is magnified to fill device screen 210 and thus becomes the new local image. As a result, device 200 may similarly zoom in on a smaller subset of contextual image 620, such that the smaller subset is magnified to fill projector screen 600 and thus becomes the new contextual image. Alternatively, if device 200 is not configured to "scroll" the local image (i.e., wherein "scrolling" may also refer additionally or exclusively to zooming), then, rather than zooming in on a smaller subset of contextual image 620, visual indicator 625 may instead by zoomed (e.g., contracted) to reflect the new relationship between the new, zoomed local image and contextual image 620. These zooming techniques may also be applied in addition to any horizontal and/or vertical scrolling operations. The above-described scrolling and/or zooming techniques may additionally or alternatively comprise similar operations such as panning, jumping, etc.

Although described above primarily in the context of a single device 200 both displaying a local image and projecting a contextual image to an external surface, other device configurations are possible. For example, given potential projection limitations of a handheld device, such as device 200, device 200 may connect to one or more additional devices, such as a traditional table-top projector, to project contextual image 620 while device 200 continues to display local image 610. In this embodiment, device 200 may continue to monitor its proximity to the display surface 600, and may communicate such proximity information to the projector, or an intermediate device coupled to the projector, to maintain visual alignment between device 200 and display surface 600, or to otherwise determine appropriate dimensional or resolution relationships between local image 610 and contextual image 620.

Contextual image 620 may also be displayed using techniques other than projection onto a physical surface. For example, device 200 may be coupled with or communicate with one or more other devices for the purpose of displaying contextual image 620 on a separate device screen, such as an LCD, plasma, or cathode-ray screen. For example, device 200 could connect to a separate computer monitor screen for the purpose of displaying—either directly or indirectly through the use of one or more intermediate devices, such as a traditional desktop or laptop computer—contextual image 620 on the separate computer monitor screen. In this embodiment, device 200 may monitor its proximity to the separate computer monitor screen, and may communicate such proximity information to the computer monitor screen, or an intermediate device coupled to the computer monitor screen, to maintain visual alignment between device 200 and the computer monitor screen or to otherwise determine appropriate dimensional or resolution relationships between local image 610 and contextual image 620.

Device 200 need also not be a handheld, or even necessarily a small, device. For example, device 200 could comprise a conventional desktop or laptop computer, either coupled to or integrated with an LCD, cathode-ray, or other type of computer monitor screen. A user could display local image 610 on a desktop computer monitor screen while contextual image 620 is simultaneously projected onto an external surface, such as an office or cubical wall behind the computer monitor screen. In this manner, the user could use his or her computer to view images, such as maps, documents, or other data, in a normal fashion. And, at any point, if the user wishes to view the broader context of the image data being depicted on his or her computer monitor screen, could instruct his or her desktop or laptop computer to project or otherwise display a broader contextual image on a surface that lies behind the computer monitor screen.

In other embodiments, the relationship between the image displayed on device 200 and an external surface 600, or a separate device screen, may be reversed from that described above. In particular, rather than displaying a contextual image on the external surface or screen and displaying a subset of that contextual image as a local image on device 200, device 200 may instead display a contextual image while projecting, displaying, or causing to be projected or displayed a local image that is a subset of the contextual image displayed on device 200. In this embodiment, device 200 may be used to view the broader context of an externally displayed projected local image, while the local image may be displayed on or projected onto a larger screen or surface to allow for an improved view of fine details, for example in a group setting, within the local image. In this embodiment, device 200 may similarly display a rectangle or other visual indicator to indicate the relationship between the contextual image and the local image. And, the user may scroll one or both images using the same techniques as described above with respect to FIGS. 9-11.

Although the above-described embodiments have been described in the context of displaying map information for purposes of illustration only, other applications of the invention are possible. For example, the foregoing techniques may also be used to display and explore medical images, such as x-rays and MRIs. Details of an x-ray or MRI could be explored by displaying on a smaller device, such as a handheld device, a higher resolution local image that focuses on a particular area in the x-ray, while the full x-ray, or a broader subset of the x-ray image, could be displayed for context on an external screen or surface. In a further enhancement of this technique, the local image could display MRI information while the contextual image displays x-ray information, or vice-versa.

The foregoing techniques may also be used to explore documents, photographs, or document or photograph libraries. For example, a handheld device could display a single image—for example, using a high resolution display—while the external contextual image could display a library of images (or a subset of the library of images) to which the locally displayed image belongs. This application of the invention, for example, may not require precise visual alignment or any alignment at all. Likewise, a handheld device could display a particular section of a document or file in sufficient detail to allow the user of the handheld device to read or study certain details, while the external contextual image could display the document as a whole, or a larger subset of the document, in a lower resolution or granularity to allow the user to ascertain the context of the locally displayed section.

The foregoing techniques are also not limited to two-dimensional data, but may also applied to three-dimensional or other multi-dimensional data in order to provide simultaneous local and contextual display. For example, the foregoing techniques could be used to simultaneously display local and contextual astronomical data, such as star maps, which may conform to a spherical, rather than flat or two-dimensional, organizational structure.

The foregoing description of the invention, along with its associated embodiments, has been presented for purposes of illustration only. It is not exhaustive and does not limit the invention to the precise form disclosed. Those skilled in the art will appreciate from the foregoing description that modifications and variations are possible in light of the above teachings or may be acquired from practicing the invention. The steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents.

What is claimed is:

1. A method of simultaneously displaying local and contextual images, comprising:
    displaying a first image on a first surface, wherein the first surface comprises a first device screen associated with a first device; and
    displaying a second image on a second surface of a second device screen associated with a second device that is external to the first device, wherein:

the first image corresponds to a subset of the second image;

the first image is computed based at least in part on a determined distance to the second surface;

the first surface is smaller than the second surface; and the first and second images are displayed simultaneously.

2. The method of claim 1, wherein the first and second images are displayed such that the first image is visually aligned with the second image.

3. The method of claim 2, wherein visually aligning the first image with the second image comprises displaying the first and second images such that:

the first image matches dimensions and content of the subset of the second image when the first surface is placed in front of the second surface in a line of sight;

the first image obscures all or substantially all of the subset of the second image in the line of sight; and the first image does not obscure significantly more of the second image than the subset of the second image in the line of sight.

4. The method of claim 1, further comprising:

receiving a scrolling command in the first device; and in response to receiving the scrolling command, simultaneously scrolling the first image and the second image in proportion to the scrolling command.

5. The method of claim 4, wherein simultaneously scrolling the first image and the second image comprises maintaining visual alignment between the first image and the second image.

6. The method of claim 1, further comprising:

displaying a visual indication on the second image of boundaries of the subset of the second image corresponding to the first image.

7. The method of claim 6, further comprising:

receiving a scrolling command in the first device; and in response to receiving the scrolling command:

scrolling the first image in proportion to the scrolling command; and simultaneously scrolling the visual indication on the second image to indicate a new subset of the second image corresponding to the first image as a result of the scrolling command.

8. The method of claim 7, further comprising:

displaying the second image in a substantially constant manner while scrolling the first image.

9. The method of claim 8, wherein the scrolling command is received in the first device by a user physically moving or tilting the first device.

10. The method of claim 1, wherein displaying the second image comprises:

using the first device to project the second image onto the second surface.

11. The method of claim 1, wherein displaying the second image comprises:

using a second device to project the second image onto the second surface.

12. The method of claim 1, wherein displaying the second image comprises:

using a second device to display the second image on a second device screen associated with the second device.

13. The method of claim 1, wherein the first image comprises more granular visual information than the corresponding subset of the second image.

14. A system for simultaneously displaying local and contextual images, comprising:

a first display screen of a first device;

a processing system comprising one or more processors; and a memory system comprising one or more computer-readable media, wherein the computer-readable media contain instructions that, when executed by the processing system, cause the system to perform operations comprising:

displaying a first image on a first surface of the first display screen;

computing a second image to be displayed on a second surface of a second display screen of a second device that is external to the first device, the first image being computed based at least in part on a determined distance to the second surface; and displaying the second image on the second surface, wherein the first image corresponds to a subset of the second image;

the first surface is smaller than the second surface; and the first and second images are displayed simultaneously.

15. The system of claim 14, wherein the first and second images are displayed such that the first image is visually aligned with the second image.

16. The system of claim 15, wherein visually aligning the first image with the second image comprises displaying the first and second images such that:

the first image matches dimensions and content of the subset of the second image when the first surface is placed in front of the second surface in a line of sight;

the first image obscures all or substantially all of the subset of the second image in the line of sight; and the first image does not obscure significantly more of the second image than the subset of the second image in the line of sight.

17. The system of claim 14, wherein the operations further comprise:

receiving a scrolling command; and in response to receiving the scrolling command, simultaneously scrolling the first image and the second image in proportion to the scrolling command.

18. The system of claim 17, wherein simultaneously scrolling the first image and the second image comprises maintaining visual alignment between the first image and the second image.

19. The system of claim 14, wherein the operations further comprise:

displaying a visual indication on the second image of boundaries of the subset of the second image corresponding to the first image.

20. The system of claim 19, wherein the operations further comprise:

receiving a scrolling command; and in response to receiving the scrolling command:

scrolling the first image in proportion to the scrolling command; and simultaneously scrolling the visual indication on the second image to indicate a new subset of the second image corresponding to the first image as a result of the scrolling command.

21. The system of claim 20, wherein the operations further comprise:

displaying the second image in a substantially constant manner while scrolling the first image.

22. The system of claim 21, wherein the scrolling command is received in the system by a user physically moving or tilting the computer system.

23. The system of claim 14, wherein displaying the second image comprises:
   using the system to project the second image onto the second surface.

24. The system of claim 14, wherein displaying the second image comprises:
   using a second device to project the second image onto the second surface.

25. The system of claim 14, wherein displaying the second image comprises:
   using a second device to display the second image on a second device screen associated with the second device.

* * * * *